(12) United States Patent
Kim et al.

(10) Patent No.: US 9,921,348 B2
(45) Date of Patent: Mar. 20, 2018

(54) MULTILAYERED OPTICAL FILM AND DISPLAY DEVICE

(71) Applicants: SAMSUNG ELECTRONICS CO., LTD., Suwon-si, Gyeonggi-do (KR); CHEIL INDUSTRIES INC., Gumi-si, Gyeongsangbuk-do (KR)

(72) Inventors: Hee-Kyung Kim, Seongnam-si (KR); Kyoung Ah Oh, Seoul (KR); Moon Yeon Lee, Osan-si (KR); Kyu Yeol In, Seoul (KR); Myung Sup Jung, Seongnam-si (KR); Ji-Hoon Lee, Suwon-si (KR)

(73) Assignees: SAMSUNG ELECTRONICS CO., LTD., Gyeonggi-Do (KR); CHEIL INDUSTRIES INC., Gyeongsangbuk-Do (KR)

( * ) Notice: Subject to any disclaimer, the term of this patent is extended or adjusted under 35 U.S.C. 154(b) by 539 days.

(21) Appl. No.: 14/139,079

(22) Filed: Dec. 23, 2013

(65) Prior Publication Data

US 2014/0185267 A1 Jul. 3, 2014

(30) Foreign Application Priority Data

Dec. 27, 2012 (KR) ........................ 10-2012-0155342

(51) Int. Cl.
*G02B 5/30* (2006.01)

(52) U.S. Cl.
CPC ......... *G02B 5/3016* (2013.01); *G02B 5/3083* (2013.01); *G02B 5/3025* (2013.01); *G02B 5/3041* (2013.01)

(58) Field of Classification Search
CPC ...... G02B 5/30; G02B 5/3016; G02B 5/3025; G02B 5/3041; G02B 5/3083; G02B 5/32
(Continued)

(56) References Cited

U.S. PATENT DOCUMENTS

| 6,641,874 B2 | 11/2003 | Kuntz et al. |
| 6,894,751 B2 | 5/2005 | Payne et al. |

(Continued)

FOREIGN PATENT DOCUMENTS

| JP | 2003025414 | 1/2003 |
| JP | 2006251050 | 9/2006 |

(Continued)

OTHER PUBLICATIONS

Korean Notice of Allowance—KR Application No. 10-2012-0155342 dated Aug. 28, 2015, citing KR10-2009-0107938, JP2010-005511, and JP2006-251050.

(Continued)

*Primary Examiner* — Thomas K Pham
*Assistant Examiner* — Nicholas R Pasko
(74) *Attorney, Agent, or Firm* — Cantor Colburn LLP

(57) ABSTRACT

An optical film includes: a first optical phase retardation layer having a relation $nx_1 \geq ny_1 \geq nz_1$; a second optical phase retardation layer disposed under the first optical phase retardation layer and having a relation $nx_2 \approx ny_2 < nz_2$; and a third optical phase retardation layer disposed on the first optical phase retardation layer and having a relation $nx_3 \approx ny_3 < nz_3$, where $nz_i$ (i=1, 2, 3) denotes a refractive coefficient in a thickness direction of the i-th optical phase retardation layer, and $nx_i$ and $ny_i$ denote refractive coefficients in two orthogonal directions in a plane substantially perpendicular to the thickness direction of the i-th optical phase retardation layer.

13 Claims, 13 Drawing Sheets

(58) Field of Classification Search
USPC ............ 359/486.01, 486.02, 489.06, 489.07
See application file for complete search history.

(56) References Cited

U.S. PATENT DOCUMENTS

| | | | |
|---|---|---|---|
| 6,995,825 B2 | 2/2006 | Graham et al. | |
| 7,236,221 B2* | 6/2007 | Ishikawa | G02B 5/3083 349/117 |
| 7,283,189 B2* | 10/2007 | Jeon | G02F 1/133634 349/118 |
| 7,538,836 B2* | 5/2009 | Fujita | G02B 5/3083 349/98 |
| 7,554,636 B2 | 6/2009 | Nakatsugawa | |
| 7,663,718 B2 | 2/2010 | Yoon et al. | |
| 7,709,578 B2* | 5/2010 | Shinagawa | B29D 11/0073 156/307.3 |
| 8,587,756 B2 | 11/2013 | Sabae et al. | |
| 2005/0128380 A1 | 6/2005 | Zieba et al. | |
| 2006/0203162 A1* | 9/2006 | Ito | G02F 1/13363 349/117 |
| 2006/0221286 A1* | 10/2006 | Allen | G02B 5/3083 349/121 |
| 2006/0274229 A1* | 12/2006 | Ito | G02F 1/133634 349/96 |
| 2008/0196830 A1 | 8/2008 | Tazaki et al. | |
| 2010/0045910 A1* | 2/2010 | Bitou | G02B 5/305 349/118 |
| 2010/0171916 A1* | 7/2010 | Mazaki | G02B 5/3016 349/127 |
| 2012/0287360 A1* | 11/2012 | Sharp | G02B 27/26 349/15 |
| 2013/0163082 A1* | 6/2013 | Tamada | G02B 5/3083 359/489.07 |

FOREIGN PATENT DOCUMENTS

| | | |
|---|---|---|
| JP | 2010055115 | 3/2010 |
| KR | 1020090107938 | 10/2009 |

OTHER PUBLICATIONS

Korean Office Action—KR Application No. 10-2012-0155342 dated Mar. 31, 2015, citing JP2003-025414.

* cited by examiner

MULTILAYERED OPTICAL FILM AND DISPLAY DEVICE

This application claims priority to Korean Patent Application No. 10-2012-0155342 filed on Dec. 27, 2012, and all the benefits accruing therefrom under 35 U.S.C. § 119, the entire contents of which are incorporated herein by reference.

BACKGROUND (a) Field

Embodiments relate to an optical film, and in particular, to a multilayered optical film and a display device having the same.

(b) Description of the Related Art

Flat panel displays may be classified into emitting display devices that emit light by themselves and non-emitting display devices that require separate light sources. Optical compensation films such as phase difference films may often be used for improving image quality of the flat panel displays.

In an emitting display device, for example, an organic light emitting display, visibility and contrast ratio may be decreased due to reflection of external light by metal such as an electrode in the display device. In order to reduce such deterioration, a polarizing plate and a phase difference film are used to prevent the external light reflected in the display device from leaking out of the display device.

In a liquid crystal display ("LCD"), which is a non-emitting display device, reflection of external light and sunglass-effect may be reduced by converting linear polarization into circular polarization according to the types of the LCD including a transmissive type, a transflective type, and a reflective type, thereby improving the image quality of the LCD.

However, developed optical compensation films may have insufficient compensation characteristics.

SUMMARY

An optical film according to an exemplary embodiment includes: a first optical phase retardation layer having a relation $nx_1 \geq ny_1 \geq nz_1$; a second optical phase retardation layer disposed under the first optical phase retardation layer and having a relation $nx_2 \approx ny_2 < nz_2$; and a third optical phase retardation layer disposed on the first optical phase retardation layer and having a relation $nx_3 \approx ny_3 < nz_3$, where $nz_i$ (i=1, 2, 3) denotes a refractive coefficient in a thickness direction of the i-th optical phase retardation layer, and $nx_i$ and $ny_i$ denote refractive coefficients in two orthogonal directions in a plane substantially perpendicular to the thickness direction of the i-th optical phase retardation layer.

An exemplary optical film may satisfy a relation $|Rth_1|-|Rth_2+Rth_3|<100$ nm, where $Rth_i$ (i=1, 2, 3) denotes an out-of-phase retardation of the i-th optical phase retardation layer and is defined as $Rth_i=((nx_i+ny_i)/2-nz_i)\times d_i$, where $d_i$ (i=1, 2, 3) denotes a thickness of the i-th optical phase retardation layer.

The second optical phase retardation layer and the third optical phase retardation layer may satisfy a relation $|Rth_2-Rth_3|<150$ nm.

The second optical phase retardation layer and the third optical phase retardation layer may satisfy a relation $|Rth_2-Rth_3|<20$ nm.

The first optical phase retardation layer may be a quarter wave plate.

The first optical phase retardation layer may include a coating, and the coating may include a liquid crystal material.

The first optical phase retardation layer may further include an alignment layer configured to align the liquid crystal material.

The coating may have reversed wavelength dispersion.

The first optical phase retardation layer may include at least one biaxial optical anisotropic sublayer.

The optical film may further include a polarization layer disposed under the second optical phase retardation layer. In another exemplary embodiment, the optical film may further include a polarization layer disposed on the third optical phase retardation layer.

In the exemplary embodiment including a polarization layer disposed under the second optical phase retardation layer, the first optical phase retardation layer may be a quarter wave plate.

In the exemplary embodiment including a polarization layer disposed on the third optical phase retardation layer, the first optical phase retardation layer may be a quarter wave plate.

An organic light emitting display according to an exemplary embodiment includes: an organic light emitting panel; and an optical film disposed on the organic light emitting panel. The optical film includes: a first optical phase retardation layer having a relation $nx_1 \geq ny_1 \geq nz_1$; a second optical phase retardation layer disposed under the first optical phase retardation layer and having a relation $nx_2 \approx ny_2 < nz_2$; a third optical phase retardation layer disposed on the first optical phase retardation layer and having a relation $nx_3 \approx ny_3 < nz_3$; and a polarization layer disposed on the third optical phase retardation layer, where $nz_i$ (i=1, 2, 3) denotes a refractive coefficient in a thickness direction of the i-th optical phase retardation layer, and $nx_i$ and $ny_i$ denote refractive coefficients in two orthogonal directions in a plane substantially perpendicular to the thickness direction of the i-th optical phase retardation layer.

The exemplary organic light emitting display may satisfy a relation $|Rth_1|-|Rth_2+Rth_3|<100$ nm, where $Rth_i$ (i=1, 2, 3) denotes an out-of-phase retardation of the i-th optical phase retardation layer and is defined as $Rth_i=((nx_i+ny_i)/2-nz_i)\times d_i$ where $d_i$ (i=1, 2, 3) denotes a thickness of the i-th optical phase retardation layer.

In the exemplary organic light emitting display, the second optical phase retardation layer and the third optical phase retardation layer may satisfy a relation $|Rth_2-Rth_3|<20$ nm.

In the exemplary organic light emitting display, the first optical phase retardation layer may be a quarter wave plate.

In the exemplary organic light emitting display, the first optical phase retardation layer may include a coating, and the coating may include a liquid crystal material.

In the exemplary organic light emitting display, the first optical phase retardation layer may further include an alignment layer configured to align the liquid crystal material.

DETAILED DESCRIPTION

Figure 1:
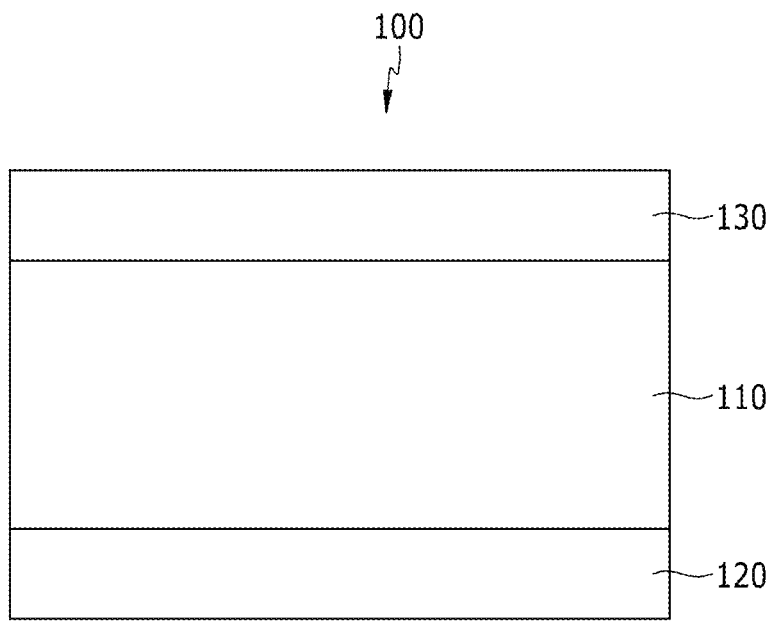
FIG. 1 is a schematic sectional view of an optical film for a display device according to an exemplary embodiment.

Aspects of one or more of the embodiments will be described more fully hereinafter with reference to the accompanying drawings. As those skilled in the art would realize, the described embodiments may be modified in various different ways, all without departing from the spirit or scope. In the drawing, parts having no relationship with the explanation are omitted for clarity, and the same or similar reference numerals designate the same or similar elements throughout the specification.

It will be understood that when an element or layer is referred to as being "on," "connected to" or "coupled to" another element or layer, the element or layer can be directly on, connected or coupled to another element or layer or intervening elements or layers. In contrast, when an element is referred to as being "directly on," "directly connected to" or "directly coupled to" another element or layer, there are no intervening elements or layers present. As used herein, connected may refer to elements being physically and/or electrically connected to each other. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "lower," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the invention will be described in detail with reference to the accompanying drawings.

An optical film for a display device according to an exemplary embodiment is described in detail with reference to FIG. 1 to FIG. 5.

Figure 2:
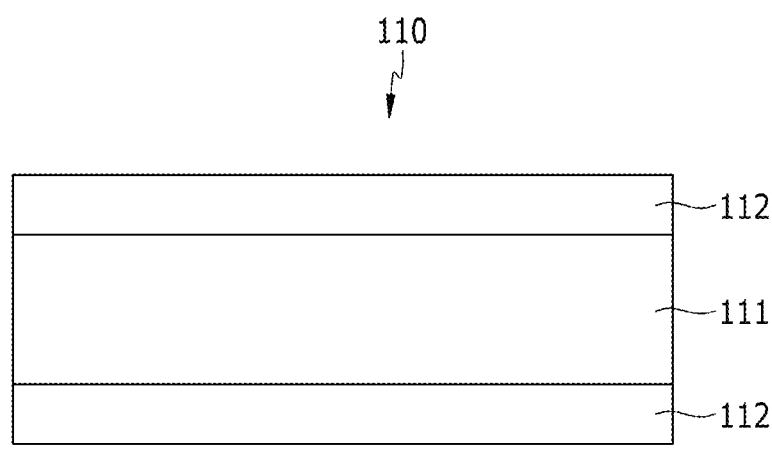
FIGS. 2 to 4 are schematic sectional views of an optical phase retardation layer of an optical film for a display device according to exemplary embodiments.
Figure 3:
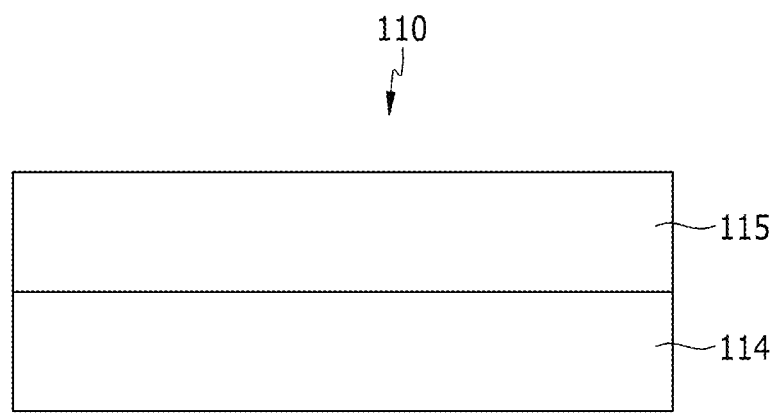
Figure 4:
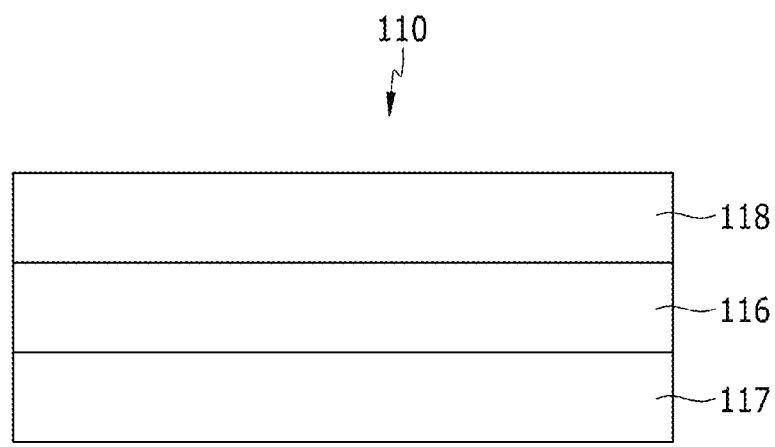
Figure 5:
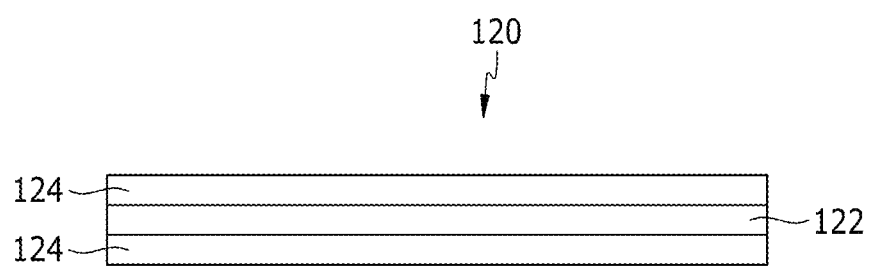
FIG. 5 is a schematic sectional view of a c-plate layer of an optical film for a display device according to an alternative exemplary embodiment.

FIG. 1 is a schematic sectional view of an optical film for a display device according to an exemplary embodiment, FIGS. 2 to 4 are schematic sectional views of an optical phase retardation layer of an optical film for a display device according to embodiments, and FIG. 5 is a schematic sectional view of a c-plate layer of an optical film for a display device according to an alternative exemplary embodiment.

Referring to FIG. 1, an optical film 100 for a display device according to an exemplary embodiment includes three optical phase retardation layers, for example, a lower optical phase retardation layer 120, an intermediate optical phase retardation layer 110, and upper optical phase retardation layer 130, which are stacked in sequence.

According to an exemplary embodiment, the intermediate optical phase retardation layer 110 may have an in-plane retardation value from about 110 nanometers (nm) to about 160 nm, for example, from about 120 nm to about 150 nm for incident light having a wavelength of about 550 nm that will be referred to as a "standard wavelength." The in-plane retardation Re is given by Re=$(n_x-n_y) \times d$, where d denotes a thickness of the layer 110, and $n_x$ and $n_y$ denote refractive coefficients in two orthogonal directions in a plane substantially perpendicular to a thickness direction. Therefore, the optical phase retardation layer 110 may serve as a quarter-wave plate.

According to an exemplary embodiment, the optical phase retardation layer 110 has a positive value of an out-of-plane retardation Rth in the thickness direction. The out-of-plane retardation Rth is given by Rth=$\{[(n_x+n_y)/2]-n_z\} \times d$, where d denotes the thickness of the layer 110, $n_z$ denotes a refractive coefficient in the thickness direction, and $n_x$ and $n_y$ denote refractive coefficients in two orthogonal directions in a plane substantially perpendicular to the thickness direction.

According to an exemplary embodiment, $n_x \geq n_y \geq n_z$.

The optical phase retardation layer 110 may have a slow axis that may be substantially parallel to or perpendicular to a surface normal of the layer 110, or may be oblique to the surface normal. The slow axis of the optical phase retardation layer 110 may vary depending on a position in the thickness direction.

According to an exemplary embodiment, the optical phase retardation layer 110 may include a polymer, for example, a discotic nematic liquid crystal material. The optical phase retardation layer 110 may further include an alignment layer configured to align the liquid crystal material.

The optical phase retardation layer 110 may have a single-layer structure, or may include at least two sublayers.

According to an embodiment, the optical phase retardation layer 110 may include at least one biaxial optical anisotropic sublayer.

Referring to FIG. 2, for example, the optical phase retardation layer 110 according to an exemplary embodiment may include a base sublayer 111 and a coating 112 on the base sublayer 111. The coating 112 may include a liquid crystal material, and may have reversed wavelength dispersion. Alternatively, the coating 112 may be a non-liquid-crystalline polymer.

Referring to FIG. 3, the optical phase retardation layer 110 according to an alternative exemplary embodiment may include at least two optical anisotropic sublayers 114 and 115 having difference slow axes. For example, the optical phase retardation layer 110 may include a lower sublayer 114 of negative birefringence and an upper sublayer 115 of positive birefringence, and the lower sublayer 114 and the upper sublayer 115 may have slow axes that are not coincident. Examples of the positively birefringent material for the upper sublayer 115 may include resins including a cyclo-olefin homopolymer (COP) and cyclo-olefin copolymer (COC), and examples of the negatively birefringent material for the lower sublayer 114 may include poly(methyl methacrylate) (PMMA).

Referring to FIG. 4, the optical phase retardation layer 110 according to an alternative embodiment may include a lower sublayer 117, an upper sublayer 118, and an intermediate sublayer 116 disposed between the lower sublayer 117 and the upper sublayer 118. The lower sublayer 117 and the upper sublayer 118 may have positive birefringence, and the intermediate sublayer 116 may have negative birefringence. Slow axes of the lower sublayer 117 and the upper sublayer 118 may be substantially perpendicular to a slow axis of the intermediate sublayer 116.

Examples of the positively birefringent material for the lower sublayer 117 and the upper sublayer 118 may include resins including COP and COC, and each of the lower sublayer 117 and the upper sublayer 118 may include at least one of COP and COC. Examples of the negatively birefringent material for the intermediate sublayer 116 may include denatured polystyrene resin, for example, a copolymer resin of styrene and an unsaturated monomer. As used herein, "denatured" refers to a copolymer of polystyrene having modified properties imparted by the inclusion of one or more additional monomers. An example thereof includes a copolymer resin of styrene and alicyclic monomer including an unsaturated group, such as for example, styrene maleic anhydride (SMA) copolymer. The denatured polystyrene may include a copolymer resin including styrene repeating units in an amount equal to or greater than about 80 mole percent (mol %).

The optical phase retardation layer 110 according to this exemplary embodiment may be formed by co-extruding a positive birefringence material and a negative birefringence material, stacking the positive birefringence material for the lower sublayer 117, the negative birefringence material for the intermediate sublayer 116, and the positive birefringence material for the upper sublayer 118 in sequence, and then elongating the stack of materials to form the layers 110, 120 and 130.

The optical phase retardation layer 110 may be also referred to an optical anisotropic layer or an optical compensation layer.

According to an exemplary embodiment, $n_x \approx n_y < n_z$ in each of the lower optical phase retardation layer 120 and the upper optical phase retardation layer 130, where $n_z$ denotes a refractive coefficient in the thickness direction, and $n_x$ and $n_y$ denote refractive coefficients in two orthogonal directions in a plane substantially perpendicular to the thickness direction.

The lower optical phase retardation layer 120 and the upper optical phase retardation layer 130 may be positive c-plates, and the two layers 120 and 130 will be also referred to as "c-plate layers."

According to an exemplary embodiment, a difference between a magnitude (i.e., an absolute value) of the out-of-plane retardation of the optical phase retardation layer 110 and a magnitude of a sum of the out-of-plane retardation values of the two c-plate layers 120 and 130 may be smaller than about 100 nm. That is, $\||Rth_1|-|Rth_2+Rth_3|\| < 100$ nm, where $Rth_1$ denotes the out-of-plane retardation value of the optical phase retardation layer 110, $Rth_2$ denotes the out-of-plane retardation value of the lower c-plate layer 120, and $Rth_3$ denotes the out-of-plane retardation value of the upper c-plate layer 130.

According to an exemplary embodiment, the magnitude of the sum of the out-of-plane retardation values of the two c-plate layers 120 and 130 may be substantially the same as the magnitude of the out-of-plane retardation of the optical phase retardation layer 110. According to alternative exemplary embodiment, the difference between the magnitude of the out-of-plane retardation of the optical phase retardation layer 110 and the magnitude of the sum of the out-of-plane retardation values of the two c-plate layers 120 and 130 may be equal to or less than about 20%, for example, equal to or less than about 10% of the magnitude of the out-of-plane retardation of the optical phase retardation layer 110.

According to an exemplary embodiment, a difference in the out-of-plane retardation values between the two c-plate layers 120 and 130 may smaller than about 150 nm, for example, smaller than about 20 nm. That is, $|Rth_2-Rth_3|<150$ nm or $|Rth_2-Rth_3|<20$ nm.

According to an exemplary embodiment, the out-of-plane retardation values of the c-plate layers 120 and 130 may be substantially the same or different from each other. For example, the out-of-plane retardation value of each of the c-plate layers 120 and 130 may be about a half of the out-of-plane retardation value of the optical phase retardation layer 110. According to an exemplary embodiment, a difference in the out-of-plane retardation values between the two c-plate layers 120 and 130 may equal to or smaller than about 20%, for example, equal to or smaller than about 10% of one of the out-of-plane retardation values of the two c-plate layers 120 and 130.

According to an exemplary embodiment, the c-plate layers 120 and 130 may have negative or positive out-of-plane retardation values.

The c-plate layers 120 and 130 may be single-layered, or may include at least two sublayers.

Referring to FIG. 5, for example, the c-plate layer 120 according to an exemplary embodiment may include a base sublayer 122 and a coating 124 disposed on the base sublayer 122. The coating 124 may include a liquid crystal material, and may have reversed wavelength dispersion. Alternatively, the coating 124 may be a non-liquid-crystalline polymer.

The other c-plate layer 130 may have a structure shown in FIG. 5.

The c-plate layers 120 and 130 may be combined with the optical phase retardation layer 110 by coating, lamination, deposition, vapor deposition, transfer, adhesion, or pressure sensitive adhesion (PSA).

Since the optical phase retardation layer 110 may serve as a quarter-wave plate as described above, the optical film 100 may also serve as a quarter-wave plate.

As described above, the out-of-plane retardation value of the optical phase retardation layer 110 has a sign opposite to a sign of the out-of-plane retardation values of the c-plate layers 120 and 130, and the sum of the out-of-plane retardation values of the two c-plate layers 120 and 130 may be substantially the same as the out-of-plane retardation value of the optical phase retardation layer 110. Therefore, a refractive constant $N_z$, which is defined by $N_z=(n_x-n_z)/(n_x-n_y)$, of the optical film 100 according to an exemplary embodiment may have a value of about 0.5.

Accordingly, the optical film 100 according to the exemplary embodiments may have improved optical symmetry, and thereby may exhibit improved optical compensation.

An optical film for a display device according to an exemplary embodiment is described in detail with reference to FIGS. 6 and 7.

Figure 6:
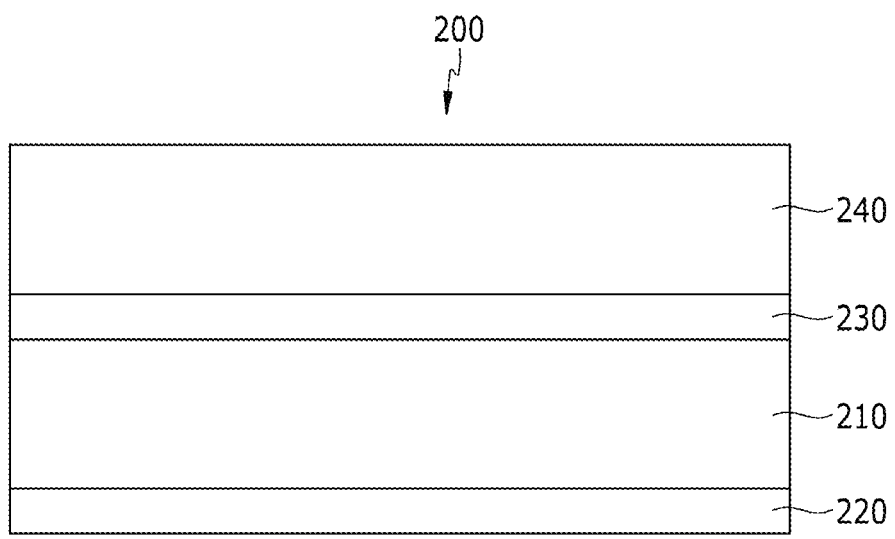
FIG. 6 is a schematic sectional view of an optical film for a display device according to an exemplary embodiment.
Figure 7:
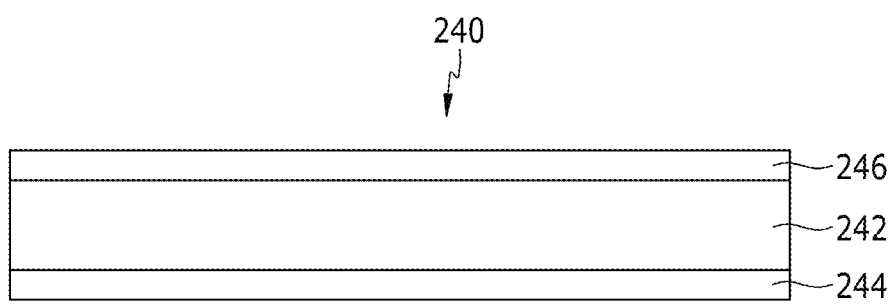
FIG. 7 is a schematic sectional view of a polarization layer of an optical film for a display device according to an exemplary embodiment.

FIG. 6 is a schematic sectional view of an optical film for a display device according to an exemplary embodiment, and FIG. 7 is a schematic sectional view of a polarization layer of an optical film for a display device according to an exemplary embodiment.

Referring to FIG. 6, an optical film 200 for a display device according to an exemplary embodiment includes an optical phase retardation layer 210, a pair of c-plate layers 220 and 230, and a polarization layer 240. The c-plate layers 220 and 230 are disposed on opposite sides of the optical phase retardation layer 210, and the polarization layer 240 is disposed on one of the c-plate layers 220.

The polarization layer 240 may be a linear polarizer configured to convert the polarization of incident light into linear polarization, and may include poly-vinyl alcohol (PVA) doped with iodine, for example.

The polarization layer 240 may be single-layered, or may include at least two sublayers.

Referring to FIG. 7, for example, the polarization layer 240 according to an exemplary embodiment may include a polarization sublayer 242 and a pair of protection sublayers 244 and 246 disposed on opposite sides of the polarization sublayer 242.

The protection sublayers 244 and 246 may protect the polarization sublayer 242, and may include triacetyl cellulose (TAC), for example. An upper protection sublayer 246 may have characteristics of anti-reflection, low-reflection, anti-glare, or hard coating. One of the two protection sublayers 244 and 246 may be omitted.

The optical phase retardation layer 210 and the c-plate layers 220 and 230 may substantially the same as the optical phase retardation layer 110 and the c-plate layers 120 and 130 described above with reference to FIGS. 1 to 5.

The optical films 100 and 200 shown in FIG. 1 and FIG. 6 may be used in flat panel displays including organic light emitting displays and liquid crystal displays.

An organic light emitting display according to an exemplary embodiment is described in detail with reference to FIGS. 8 and 9.

Figure 8:
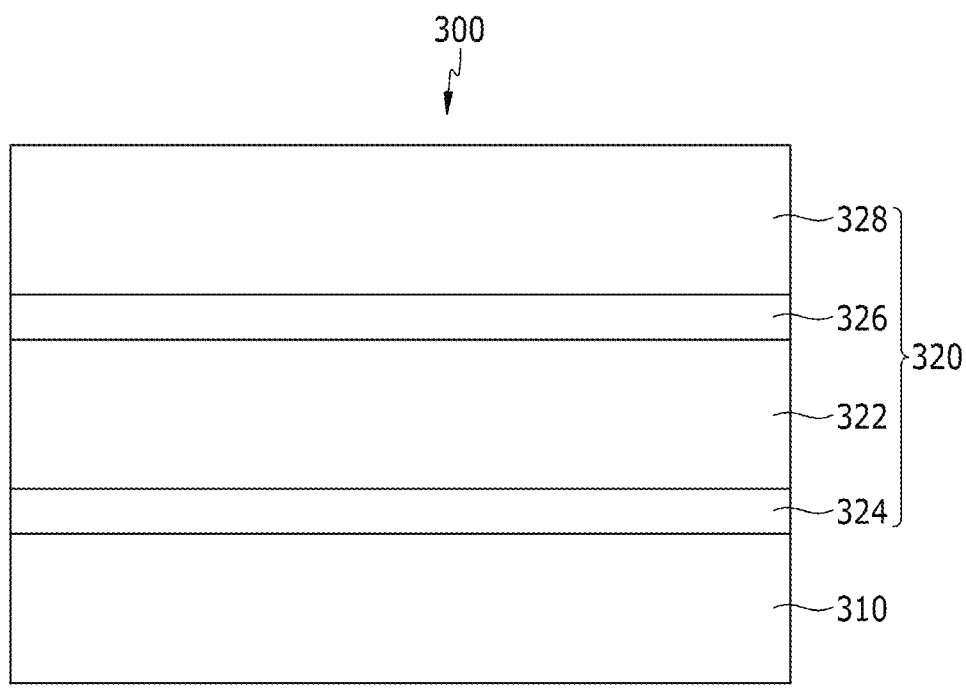
FIG. 8 is a schematic sectional view of an organic light emitting display according to an exemplary embodiment.
Figure 9:
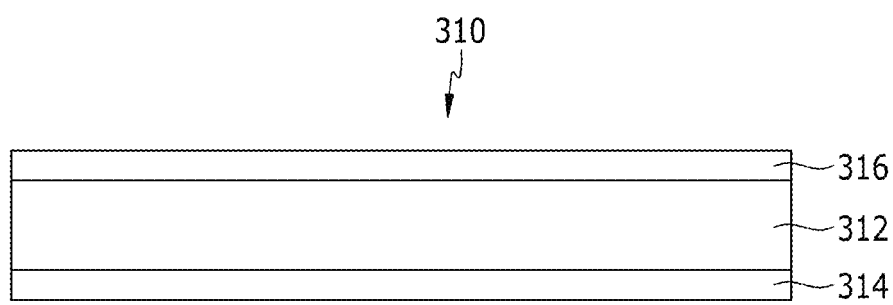
FIG. 9 is a schematic sectional view of an organic light emitting panel of an organic light emitting display according to an exemplary embodiment.

FIG. 8 is a schematic sectional view of an organic light emitting display according to an exemplary embodiment, and FIG. 9 is a schematic sectional view of an organic light emitting panel of an organic light emitting display according to an exemplary embodiment.

Referring to FIG. 8, an organic light emitting display 300 according to an exemplary embodiment includes an organic light emitting panel 310 configured to display images and an optical film 320 attached to the organic light emitting panel 310.

Referring to FIG. 9, the organic light emitting panel 310 may include a pair of electrodes 314 and 316 facing each other and a light emitting layer 312 disposed between the electrodes 314 and 316 and including an organic light emitting material.

The optical film 320 includes an optical phase retardation layer 322, a pair of c-plate layers 324 and 326, and a polarization layer 328. The c-plate layers 324 and 326 are disposed on opposite sides of the optical phase retardation layer 322, and the polarization layer 328 is disposed on an outer one of the c-plate layers 220.

The optical phase retardation layer 322 and the c-plate layers 324 and 326 may be substantially the same as the optical phase retardation layer 110 and the c-plate layers 120 and 130 described above with reference to FIGS. 1 to 5. The polarization layer 328 may be substantially the same as the polarization layer 240 described above with reference to FIGS. 6 and 7.

External light incident on the organic light emitting display 300 may enter into the organic light emitting panel 310 through the optical film 320, and may be reflected by a reflective member, for example, an electrode of the organic light emitting panel 310. In this case, the external light may be linearly polarized after passing through the polarization layer 328, and then may experience a retardation of about a quarter wavelength such that the linear polarization may be converted into a circular polarization when passing through the optical phase retardation layer 322 and the c-plate layers 324 and 326. After passing through the optical phase retardation layer 322 and the c-plate layers 324 and 326, the circularly polarized external light may be reflected by the reflective member of the organic light emitting panel 310, and then may back towards the optical phase retardation layer 322 and the c-plate layers 324 and 326 again. The reflected light may also experience a retardation of about a quarter wavelength when secondly passing through the optical phase retardation layer 322 and the c-plate layers 324 and 326 such that the circular polarization of the light may be converted into a linear polarization. As a result, the external light initially incident on the organic light emitting panel 310 after firstly passing through the polarization layer 328 may pass through the optical phase retardation layer 322 and the c-plate layers 324 and 326 twice such that a polarization axis of the external light rotates about 90 degrees when the external light reaches the polarization layer 328 again. As a result, even when external light is reflected in the organic light emitting display 300 including the organic light emitting panel 310, leaking of the reflected light from the organic light emitting display 300 is reduced or effectively prevented, thereby improving the image quality of the organic light emitting display 300.

Simulations using LCD Master are performed to test characteristics of an optical film, which are described in detail with reference to FIGS. 10 to 16.

Figure 10:
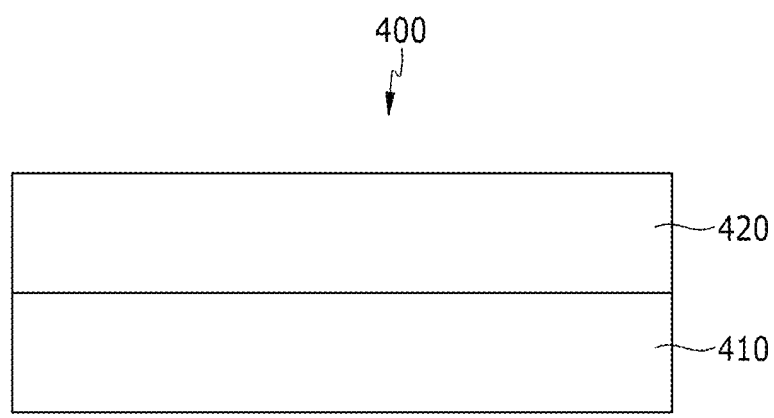
FIG. 10 and FIG. 11 are schematic sectional views of optical films according to comparative examples.
Figure 11:
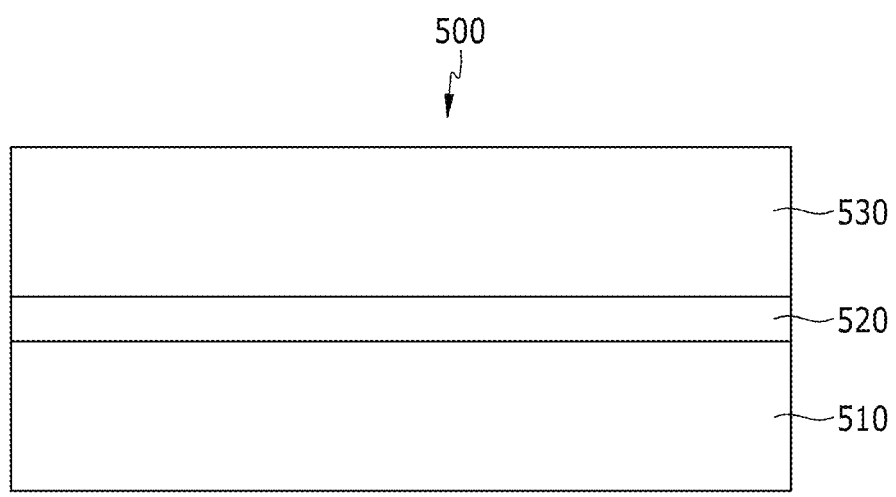
Figure 12:
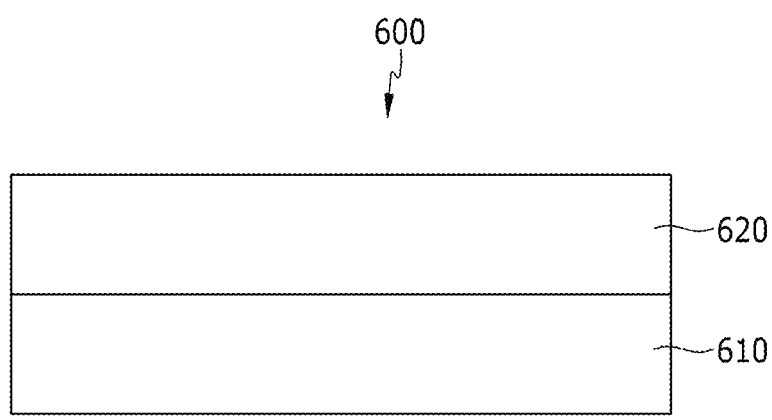
FIG. 12 is a schematic sectional view of a combination of an optical film and a reflective member according to comparative examples and exemplary embodiment examples.
Figure 13:
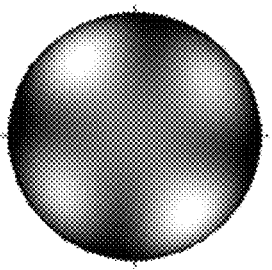
FIG. 13 is a graph illustrating reflectance and color shift of a combination of an optical film and a reflective member according to Comparative Example 1-1, Comparative Example 1-2, and Embodiment Example 1.
Figure 14:
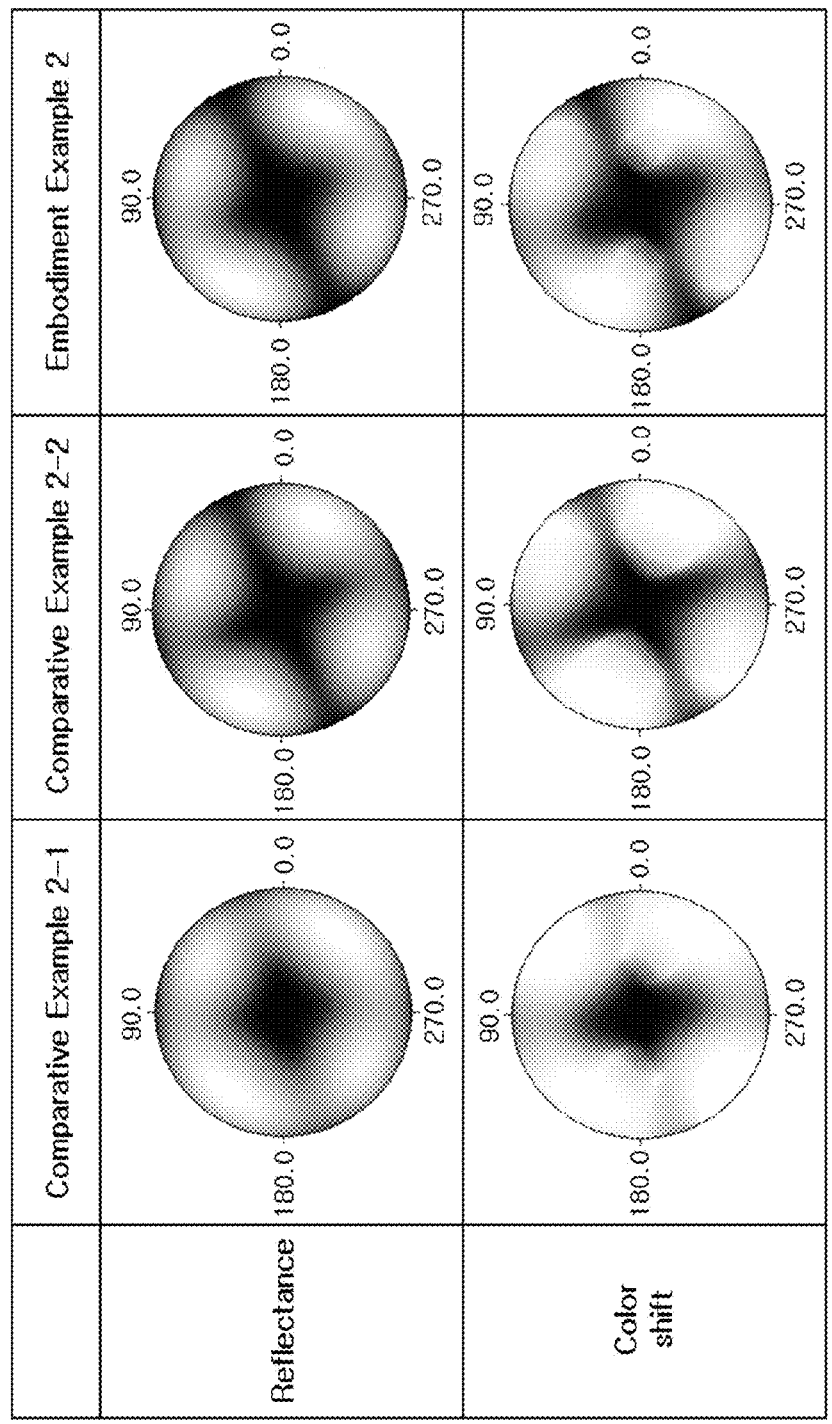
FIG. 14 is a graph illustrating reflectance and color shift of a combination of an optical film and a reflective member according to Comparative Example 2-1, Comparative Example 2-2, and Embodiment Example 2.
Figure 15:
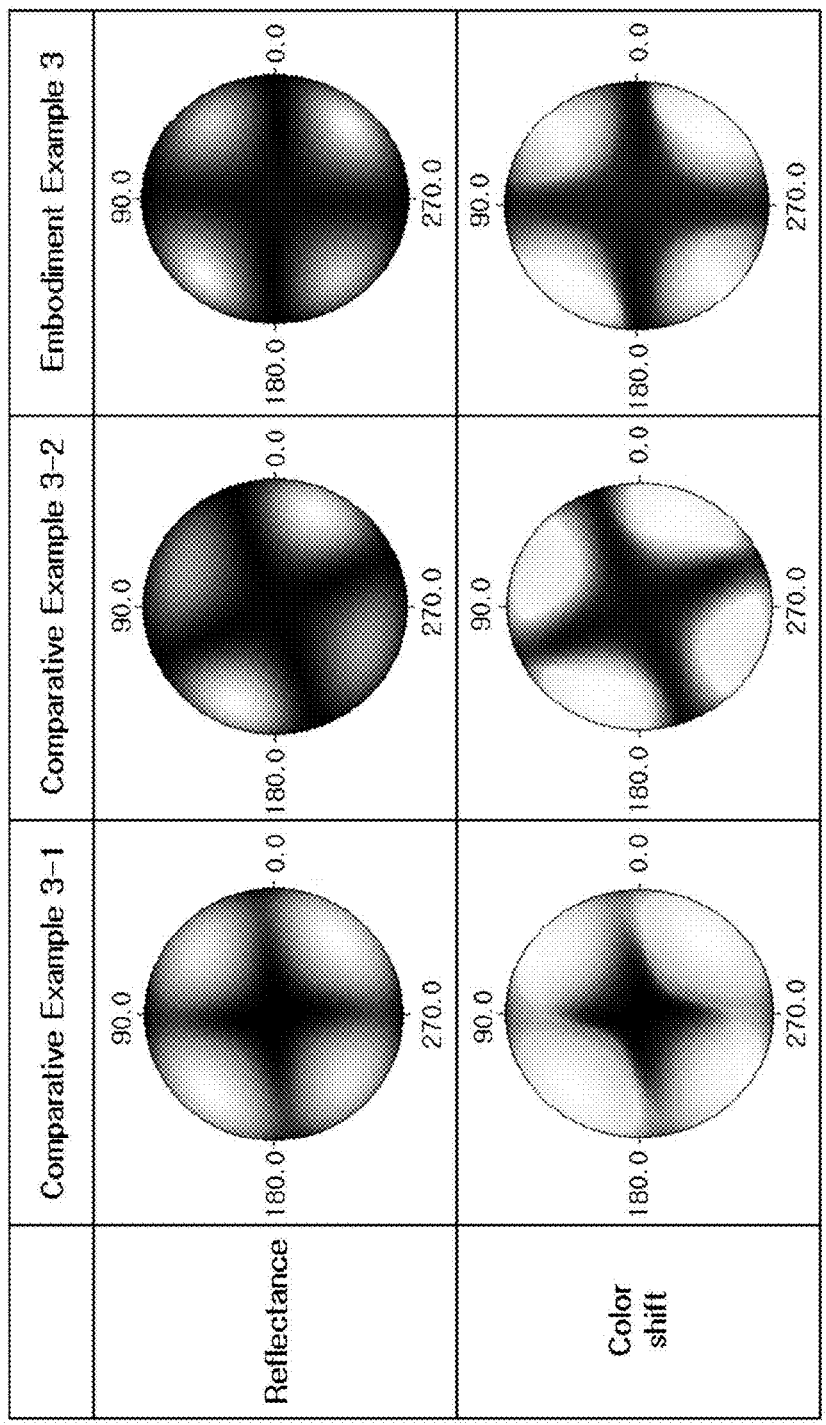
FIG. 15 is a graph illustrating reflectance and color shift of a combination of an optical film and a reflective member according to Comparative Example 3-1, Comparative Example 3-2, and Embodiment Example 3.
Figure 16:
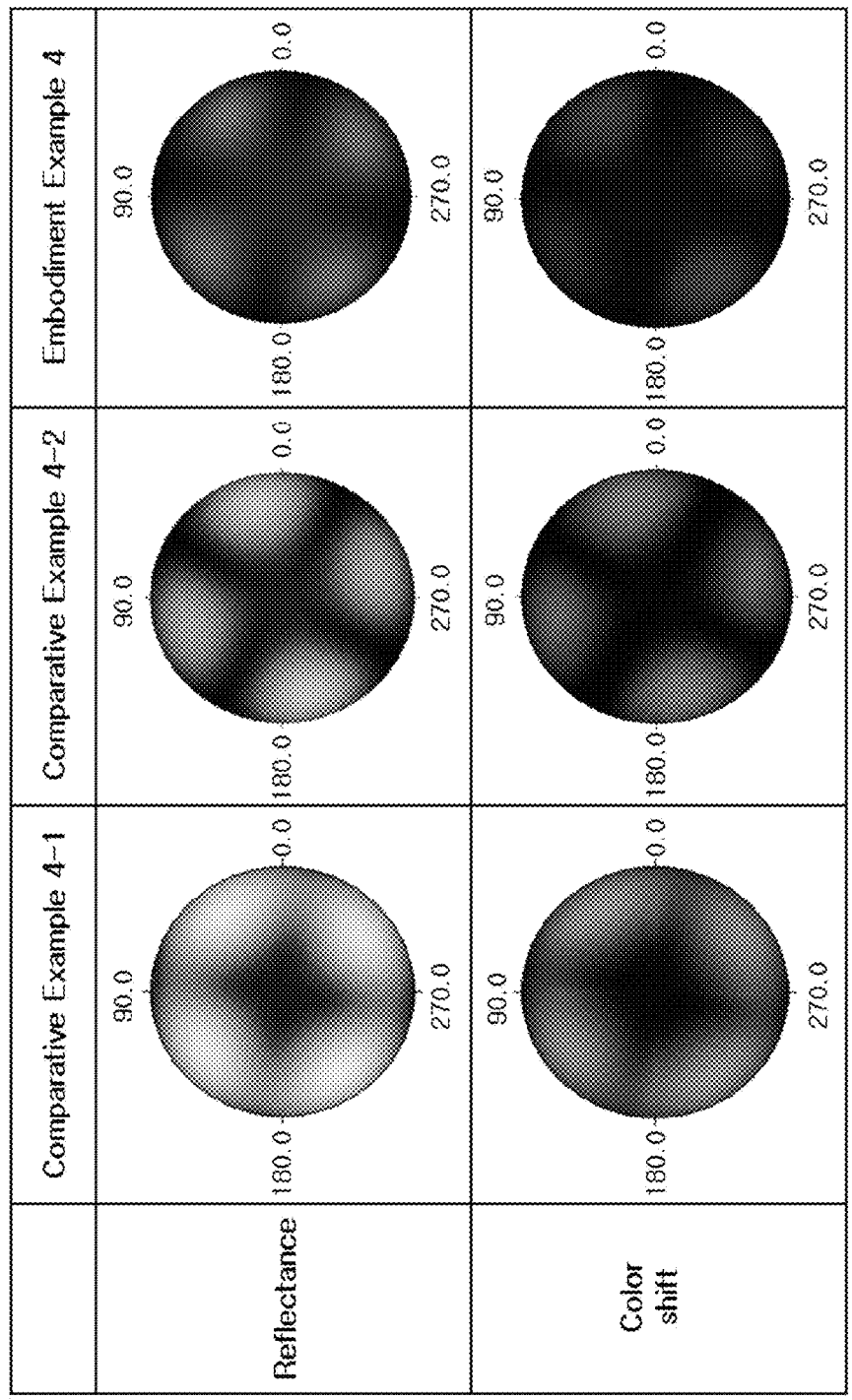
FIG. 16 is a graph illustrating reflectance and color shift of a combination of an optical film and a reflective member according to Comparative Example 4-1, Comparative Example 4-2, and Embodiment Example 4.

FIG. 10 and FIG. 11 are schematic sectional views of optical films according to comparative examples, FIG. 12 is a schematic sectional view of a combination of an optical film and a reflective member according to comparative examples and exemplary embodiment examples, FIG. 13 is a graph illustrating reflectance and color shift of a combination of an optical film and a reflective member according to Comparative Example 1-1, Comparative Example 1-2, and Embodiment Example 1, FIG. 14 is a graph illustrating reflectance and color shift of a combination of an optical film and a reflective member according to Comparative Example 2-1, Comparative Example 2-2, and Embodiment Example 2, FIG. 15 is a graph illustrating reflectance and color shift of a combination of an optical film and a reflective member according to Comparative Example 3-1, Comparative Example 3-2, and Embodiment Example 3, and FIG. 16 is a graph illustrating reflectance and color shift of a combination of an optical film and a reflective member according to Comparative Example 4-1, Comparative Example 4-2, and Embodiment Example 4.

An optical film 400 shown in FIG. 10 includes an optical phase retardation layer 410 and a polarization layer 420 disposed on the optical phase retardation layer 410, and an optical film 500 shown in FIG. 11 includes an optical phase retardation layer 510, a positive c-plate layer 520, and the polarization layer 530.

An optical film according to Comparative Example 1-1 has a structure shown in FIG. 10 with an optical phase retardation layer 410 formed by stretching a polymer film. An optical film according to Comparative Example 1-2 has a structure shown in FIG. 11 with an optical phase retardation layer 510 formed by stretching a polymer film. An optical film according to Embodiment Example 1 has a structure shown in FIG. 6 with an optical phase retardation layer 210 formed by stretching a polymer film.

Each of the optical phase retardation layers 410, 510 and 210 in Comparative Example 1-1, Comparative Example 1-2, and Embodiment Example 1 has an in-plane retardation value of about 141 nm, an out-of-plane retardation value of about 79 nm, and a thickness of about 50 µm. A c-plate layer 520 in Comparative Example 1-2 has an out-of-phase retardation value of about −79 nm and a thickness of about 1 µm. Each of c-plate layers 220 and 230 in Embodiment Example 1 has an out-of-phase retardation value of about −39 nm and a thickness of about 0.5 µm.

An optical film according to Comparative Example 2-1 has a structure shown in FIG. 10, and includes an optical phase retardation layer 410 including a lower sublayer 114 of PMMA and a upper sublayer 115 of COP as shown in FIG. 3. An optical film according to Comparative Example 2-2 as a structure shown in FIG. 11, and includes an optical phase retardation layer 510 including a lower sublayer 114 of PMMA and a upper sublayer 115 of COP as shown in FIG. 3. An optical film according to Embodiment Example 2 as a structure shown in FIG. 6, and includes an optical phase retardation layer 210 including a lower sublayer 114 of PMMA and a upper sublayer 115 of COP as shown in FIG. 3.

The lower PMMA sublayer 114 in Comparative Example 2-1, Comparative Example 2-2, and Embodiment Example 2 has an in-plane retardation value of about 140 nm, a thickness of about 55 µm, and a slow axis of about 90 degrees. The upper COP sublayer 115 in Comparative Example 2-1, Comparative Example 2-2, and Embodiment Example 2 has an in-plane retardation value of about 280 nm, a thickness of about 44 µm, and a slow axis of about 22.5 degrees. A c-plate layer 520 in Comparative Example 2-2 has an out-of-phase retardation value of about −100 nm, and each of c-plate layers 220 and 230 in Embodiment Example 2 has an out-of-phase retardation value of about −50 nm.

An optical film according to Comparative Example 3-1 has a structure shown in FIG. 10, and includes an optical phase retardation layer 410 including a lower sublayer 117 of COP, an intermediate sublayer 116 of SMA, and an upper sublayer 118 of COP as shown in FIG. 4. An optical film according to Comparative Example 3-2 as a structure shown in FIG. 11, and includes an optical phase retardation layer 510 including a lower sublayer 117 of COP, an intermediate sublayer 116 of SMA, and an upper sublayer 118 of COP as shown in FIG. 4. An optical film according to Embodiment Example 3 as a structure shown in FIG. 6, and includes an optical phase retardation layer 210 including a lower sublayer 117 of COP, an intermediate sublayer 116 of SMA, and an upper sublayer 118 of COP as shown in FIG. 4.

In Comparative Example 3-1, Comparative Example 3-2, and Embodiment Example 3, the lower COP sublayer 117 has a thickness of about 64 µm, the intermediate SMA sublayer 116 has a thickness of about 45 µm, and the upper COP sublayer 118 has a thickness of about 64 µm. A c-plate layer 520 in Comparative Example 3-2 has an out-of-phase retardation value of about −128 nm, and each of c-plate layers 220 and 230 in Embodiment Example 3 has an out-of-phase retardation of about −64 nm.

An optical film according to Comparative Example 4-1 has a structure shown in FIG. 10, and includes an optical phase retardation layer 410 including a liquid crystal coating 112 formed by a method described above with reference to FIG. 2. An optical film according to Comparative Example 4-2 has a structure shown in FIG. 11, and includes an optical phase retardation layer 510 including a liquid crystal coating 112 formed by a method described above with reference to FIG. 2. An optical film according to Embodiment Example 4 has a structure shown in FIG. 6, and includes an optical phase retardation layer 210 including a liquid crystal coating 112 formed by a method described above with reference to FIG. 2.

Each of the optical phase retardation layers 410, 510 and 210 in Comparative Example 4-1, Comparative Example 4-2, and Embodiment Example 4 has an in-plane retardation value of about 138 nm and a thickness of about 3.1 µm. A c-plate layer 520 in Comparative Example 4-2 has an out-of-phase retardation value of about −150 nm and a thickness of about 0.85 µm. Each of c-plate layers 220 and 230 in Embodiment Example 4 has an out-of-phase retardation value of about −75 nm and a thickness of about 0.44 µm.

Referring to FIG. 12, reflectance and color shift are calculated for a stack of a reflective member 610 and an optical film 620 according to Comparative Examples and Embodiment Examples on the reflective member 610. The reflective member 610 is regarded as an ideal reflector.

Referring to FIG. 13, the reflectance for Embodiment Example 1 is the lowest among Comparative Example 1-1, Comparative Example 1-2, and Embodiment Example 1. The maximum reflectance for Comparative Example 1-1 is about 4.44%, the maximum reflectance for Comparative Example 1-2 is about 2.47%, and the maximum reflectance for Embodiment Example 1 is about 1.45%. The axial reflectance for Comparative Example 1-1 is about 0.73%, the axial reflectance for Comparative Example 1-2 is about 0.72%, and the axial reflectance for Embodiment Example 1 is about 0.73%. Embodiment Example 1 shows improvement in reflectance of about 50% as compared with Comparative Example 1-1. The color shift for Embodiment Example 1 is lower than the color shifts for Comparative Example 1-1 and Comparative Example 1-2, and in particular, the lateral color shift for Embodiment Example 1 is much improved.

Referring to FIG. 14, the reflectance for Embodiment Example 2 is relatively low among Comparative Example 2-1, Comparative Example 2-2, and Embodiment Example 2. The maximum reflectance for Comparative Example 2-1 is about 9.5%, the maximum reflectance for Comparative Example 2-2 is about 8.2%, and the maximum reflectance for Embodiment Example 2 is about 6.5%. The axial reflectance for each of Comparative Example 2-1, Comparative Example 2-2, and Embodiment Example 2 is about 0.1%. Embodiment Example 2 shows improvement in reflectance of about 14% as compared with Comparative Example 2-1. The color shift for Embodiment Example 2 is lower than the color shifts for Comparative Example 2-1 and Comparative Example 2-2, and in particular, the lateral color shift for Embodiment Example 2 is much improved.

Referring to FIG. 15, the reflectance for Embodiment Example 3 is the lowest among Comparative Example 3-1, Comparative Example 3-2, and Embodiment Example 3. The maximum reflectance for Comparative Example 3-1 is about 6.9%, the maximum reflectance for Comparative Example 3-2 is about 2.6%, and the maximum reflectance for Embodiment Example 3 is about 1.2%. The axial reflectance for each of Comparative Example 3-1, Comparative Example 3-2, and Embodiment Example 3 is about 0.1%. Embodiment Example 3 shows improvement in reflectance of about 62% as compared with Comparative Example 3-1. The color shift for Embodiment Example 3 is lower than the color shifts for Comparative Example 3-1 and Comparative Example 3-2, and in particular, the lateral color shift for Embodiment Example 3 is much improved.

Referring to FIG. 16, the reflectance for Embodiment Example 4 is the lowest among Comparative Example 4-1, Comparative Example 4-2, and Embodiment Example 4. The maximum reflectance for Comparative Example 4-1 is about 6.19%, the maximum reflectance for Comparative Example 4-2 is about 3.78%, and the maximum reflectance for Embodiment Example 4 is about 1.12%. The axial reflectance for Comparative Example 4-1 is about 0.31%, the axial reflectance for Comparative Example 4-2 is about 0.38%, and the axial reflectance for Embodiment Example 4 is about 0.38%. Embodiment Example 4 shows improvement in reflectance of about 40% as compared with Comparative Example 4-1. The color shift for Embodiment Example 4 is lower than the color shifts for Comparative Example 4-1 and Comparative Example 4-2, and in particular, the lateral color shift for Embodiment Example 4 is much improved.

Optical films according to comparative examples and experimental examples were actually manufactured and tested, which will be described in detail with reference to FIGS. 17 and 18.

Figure 17:
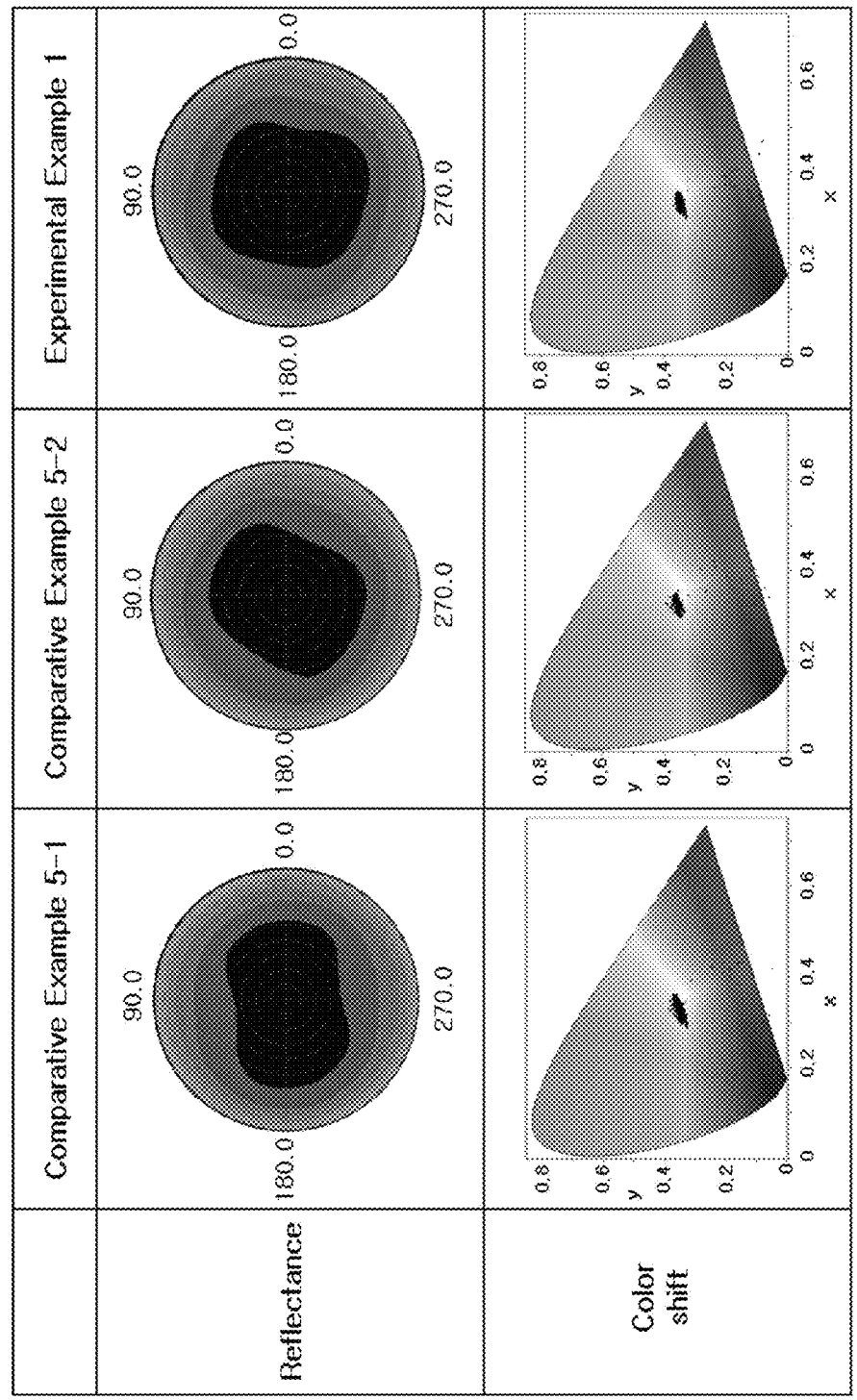
FIG. 17 is a graph illustrating reflectance and color gamut of an organic light emitting display including an optical film according to Comparative Example 5-1, Comparative Example 5-2, and Experimental Example 1.
Figure 18:
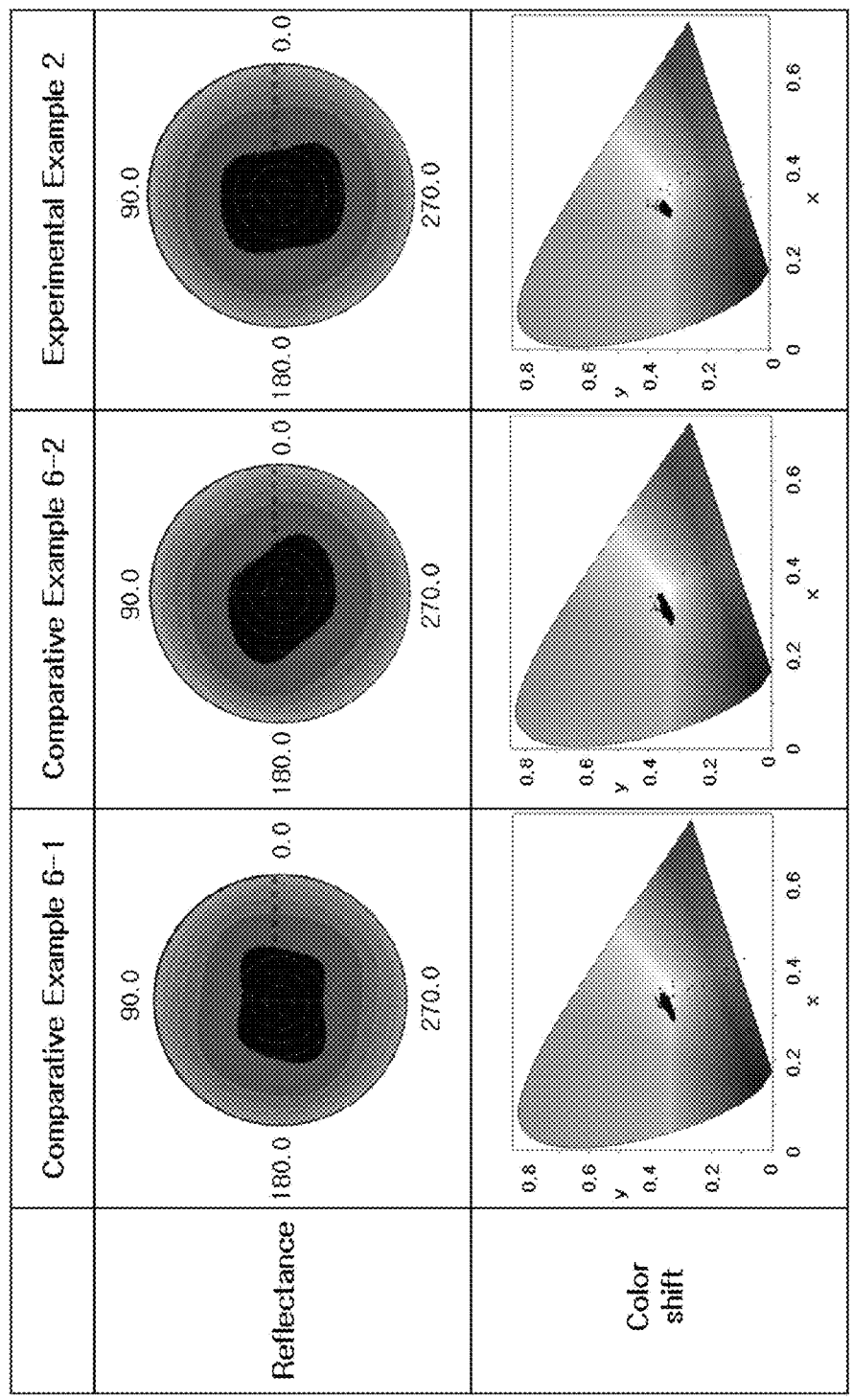
FIG. 18 is a graph illustrating reflectance and color gamut of an organic light emitting display including an optical film according to Comparative Example 6-1, Comparative Example 6-2, and Experimental Example 2.

FIG. 17 is a graph illustrating reflectance and color gamut of an organic light emitting display including an optical film according to Comparative Example 5-1, Comparative Example 5-2, and Experimental Example 1, and FIG. 18 is a graph illustrating reflectance and color gamut of an organic light emitting display including an optical film according to Comparative Example 6-1, Comparative Example 6-2, and Experimental Example 2.

First, optical films each including an optical phase retardation layer with liquid crystal coating according to Comparative Example 5-1, Comparative Example 5-2, and Experimental Example 1 were manufactured.

A TAC film having a thickness of about 40 µm was coated with a solution including a solvent of about 66.7 wt % and a reversed-wavelength-dispersive liquid crystal mixture of about 33.3 wt % by using a wire bar. The solvent included toluene and cyclolohexanone with a ratio of about 7:3, and a thickness of the solution on the TAC film was about 4 µm. Thereafter, the coated TAC film was dried for about 60 seconds under a temperature of about 65° C. Subsequently, the dried TAC film was exposed to ultra-violet light of about 80 mW for about 10 seconds to be cured, thereby forming an optical phase retardation layer including reversed-wavelength-dispersive liquid crystal. The optical phase retardation layer had an in-plane retardation value of about 132±3 nm and an out-of-phase retardation value of about 90±3 nm.

A COP film having a thickness of about 80 µm was coated with a solution including a methyl isobutyl ketone (MIBK) solvent of about 85 wt % and a positive c-plate polymer mixture of about 15 wt % by using a wire bar. A thickness of the solution on the COP film was about 2 µm or about 4 µm. Thereafter, the coated TAC film was dried for about 180 seconds under a temperature of about 80° C., thereby forming a c-plate layer. The c-plate layer with the thickness of about 2 µm had an in-plane retardation value of about 3±3 nm and an out-of-phase retardation value of about −45±3 nm. The c-plate layer with the thickness of about 4 µm had an in-plane retardation value of about 3±3 nm and an out-of-phase retardation value of about −90±3 nm.

The above-described retardation values were measured using AxoScan System.

Referring to FIG. 10, an optical phase retardation layer 410 formed as described above was stacked with a PVA polarization layer 420 to form an optical film 400 according to Comparative Example 5-1.

Referring to FIG. 11, adhesion (not shown) was coated on a surface of an optical phase retardation layer 510 formed as described above, and a c-plate layer 520 formed as described above was transferred thereon. The c-plate layer 520 had a thickness of about 4 µm and an out-of-phase retardation value of about −90 nm. Thereafter, the combination of the optical phase retardation layer 510 and the c-plate layer 520 were stacked with a PVA polarization layer 530 to form an optical film 500 according to Comparative Example 5-2.

Referring to FIG. 6, adhesion (not shown) was coated on opposite surfaces of an optical phase retardation layer 210 formed as described above, and a pair of c-plate layers 220 and 230 each formed as described above were transferred on the opposite surfaces of the optical phase retardation layer 210. Each of the c-plate layer 220 and 230 had a thickness of about 2 µm and an out-of-phase retardation value of about −45 nm. Thereafter, the combination of the optical phase retardation layer 210 and the c-plate layers 220 and 230 were stacked with a PVA polarization layer 240 to form an optical film 200 according to Experimental Example 1.

The optical film 400 (excluding the polarization layer 420) according to Comparative Example 5-1 had an in-plane retardation value of about 132 nm and an out-of-phase retardation value of about 92 nm. The optical film 500 (excluding the polarization layer 530) according to Comparative Example 5-2 had an in-plane retardation value of about 131 nm and an out-of-phase retardation value of about −5 nm. The optical film 200 (excluding the polarization layer 240) according to Experimental Example 1 had an in-plane retardation value of about 134 nm and an out-of-phase retardation value of about −4 nm.

The optical films 400, 500 and 200 according to Comparative Examples and Experimental Example were attached on an organic light emitting panel, and reflectance and color characteristics of the optical films 400, 500 and 200 were measured by using EZ contrast, which are shown in FIG. 17.

The reflectance at a polar angle of about 8 degrees was about 6.0% for Comparative Example 5-1, about 6.2% for Comparative Example 5-2, and about 5.2% for Experimental Example 1, and thus the reflectance at a polar angle of about 8 degrees for Experimental Example 1 was the lowest. The reflectance at a polar angle of about 45 degrees for Experimental Example 1 was about 7.0%, which is lower than about 7.4% for Comparative Example 5-1 and Comparative Example 5-2.

In view of color characteristics, Δa*b* at a polar angle of about 8 degrees was about 10.7 for Comparative Example 5-1, about 11.9 for Comparative Example 5-2, and about 7.5 for Experimental Example 1, and thus Δa*b* at a polar angle of about 8 degrees for Experimental Example 1 was the lowest. Δa*b* at a polar angle of about 45 degrees was about 9.9 for Comparative Example 5-1, about 10.0 for Comparative Example 5-2, and about 6.0 for Experimental Example 1, and Δa*b* at a polar angle of about 45 degrees for Experimental Example 1 was very low. Δa*b* at a polar angle of about 65 degrees was about 9.8 for Comparative Example 5-1, about 11.6 for Comparative Example 5-2, and about 8.4 for Experimental Example 1, and thus Δa*b* at a polar angle of about 65 degrees for Experimental Example 1 was relatively low.

Next, optical films each including an optical phase retardation layer formed by stretching according to Comparative Example 6-1, Comparative Example 6-2, and Experimental Example 2 were manufactured.

Referring to FIG. 10, an optical phase retardation layer 410 formed by stretching was stacked with a PVA polarization layer 420 to form an optical film 400 according to Comparative Example 6-1.

Referring to FIG. 11, an optical phase retardation layer 510 formed by stretching and a c-plate layer 520 formed as described above were stacked with a PVA polarization layer 530 to form an optical film 500 according to Comparative Example 5-2. The c-plate layer 520 had a thickness of about 4 µm and an out-of-phase retardation value of about −90 nm.

Referring to FIG. 6, an optical phase retardation layer 210 formed by stretching and a pair of c-plate layers 220 and 230 each formed as described above were stacked with a PVA polarization layer 240 to form an optical film 200 according to Experimental Example 1. Each of the c-plate layer 220 and 230 had a thickness of about 2 µm and an out-of-phase retardation value of about −45 nm.

The optical film 400 according to Comparative Example 6-1 had an in-plane retardation value of about 145 nm and an out-of-phase retardation value of about 92 nm. The optical film 500 according to Comparative Example 6-2 had an in-plane retardation value of about 144 nm and an out-of-phase retardation value of about −4 nm. The optical film 200 according to Experimental Example 1 had an in-plane retardation value of about 145 nm and an out-of-phase retardation value of about −6 nm.

The optical films 400, 500 and 200 according to Comparative Examples and Experimental Example were attached on an organic light emitting panel, and reflectance and color characteristics of the optical films 400, 500 and 200 were measured by using EZ contrast, which are shown in FIG. 18.

The reflectance at a polar angle of about 45 degrees was about 8% for Comparative Example 6-1, about 6.5% for Comparative Example 6-2, and about 6.4% for Experimental Example 2, and thus the reflectance at a polar angle of about 45 degrees for Experimental Example 2 was relatively low. The reflectance at a polar angle of about 65 degrees was about 13.4% for Comparative Example 6-1, about 12.7% for Comparative Example 6-2, and about 12.2% for Experimental Example 2, and thus the reflectance at a polar angle of about 65 degrees for Experimental Example 2 was relatively low.

In view of color characteristics, Δa*b* at a polar angle of about 45 degrees was about 1.7 for Comparative Example 6-1, about 4.0 for Comparative Example 6-2, and about 2.5 for Experimental Example 2, and Δa*b* at a polar angle of about 45 degrees was lower for Experimental Example 2 than for Comparative Example 6-2. Δa*b* at a polar angle of about 65 degrees was about 7.5 for Comparative Example 6-1, about 9.2 for Comparative Example 6-2, and about 7.7 for Experimental Example 2, and Δa*b* at a polar angle of about 65 degrees was lower for Experimental Example 2 than for Comparative Example 6-2.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:
1. An optical film comprising:
  a first optical phase retardation layer having a relation $nx_1 > ny_1 > nz_1$;
  a second optical phase retardation layer disposed under the first optical phase retardation layer and having a relation $nx_2 \approx ny_2 < nz_2$; and
  a third optical phase retardation layer disposed on the first optical phase retardation layer and having a relation $nx_3 \approx ny_3 < nz_3$, where $nz_i$ (i=1, 2, 3) denotes a refractive coefficient in a thickness direction of the i-th optical phase retardation layer, and $nx_i$ and $ny_i$ denote refractive coefficients in two orthogonal directions in a plane substantially perpendicular to the thickness direction of the i-th optical phase retardation layer; where the first optical phase retardation layer contacts the second optical phase retardation layer and the third optical phase retardation layer;

wherein the first optical phase retardation layer is a quarter wave plate, and wherein $\|Rth1|-|Rth2+Rth3\|<100$, where Rthi (i=1, 2, 3) denotes an out-of-phase retardation of the i-th optical phase retardation layer and is defined as $Rthi=i(nxi+nyi)/2-nzi)\times di$, where di (i=1, 2, 3) denotes a thickness of the i th optical phase retardation layer.

2. The optical film of claim 1, wherein the second optical phase retardation layer and the third optical phase retardation layer satisfy a relation $|Rth_2-Rth_3|<150$ nm.

3. The optical film of claim 1, wherein the first optical phase retardation layer comprises a coating, and the coating comprises a liquid crystal material.

4. The optical film of claim 1, wherein the first optical phase retardation layer comprises at least one biaxial optical anisotropic sublayer.

5. The optical film of claim 1, further comprising a polarization layer disposed under the second optical phase retardation layer.

6. The optical film of claim 1, further comprising a polarization layer disposed on the third optical phase retardation layer.

7. The optical film of claim 2, wherein the second optical phase retardation layer and the third optical phase retardation layer satisfy a relation $|Rth_2-Rth3|<20$ nm.

8. The optical film of claim 3, wherein the first optical phase retardation layer further comprises an alignment layer configured to align the liquid crystal material.

9. The optical film of claim 3, wherein the coating has a negative wavelength dispersion.

10. An organic light emitting display comprising:
an organic light emitting panel; and
an optical film disposed on the organic light emitting panel,
wherein the optical film comprises:
a first optical phase retardation layer having a relation $nx_1>ny_1>nz_1$; a second optical phase retardation layer disposed under the first optical phase retardation layer and having a relation $nx_2\approx ny_2<nz_2$;
a third optical phase retardation layer disposed on the first optical phase retardation layer and having a relation $nx_3\approx ny_3<nz_3$; and
a polarization layer disposed on the third optical phase retardation layer,
where $nz_i$ (i=1, 2, 3) denotes a refractive coefficient in a thickness direction of the i-th optical phase retardation layer, and $nx_i$ and nyi denote refractive coefficients in two orthogonal directions in a plane substantially perpendicular to the thickness direction of the i-th optical phase retardation layer; where the first optical phase retardation layer contacts the second optical phase retardation layer and the third optical phase retardation layer,
wherein the first optical phase retardation layer is a quarter wave plate, and wherein $\|Rth1|-|Rth2+Rth3\|<100$, where Rthi (i=1, 2, 3) denotes an out-of-phase retardation of the i-th optical phase retardation layer and is defined as $Rthi=(nxi+nyi)/2-nzi)\times di$, where di (i=1, 2, 3) denotes a thickness of the i th optical phase retardation layer.

11. The organic light emitting display of claim 10, wherein the second optical phase retardation layer and the third optical phase retardation layer satisfy a relation $|Rth2-Rth3|<20$ nm.

12. The organic light emitting display of claim 10, wherein the first optical phase retardation layer comprises a coating, and the coating comprises a liquid crystal material.

13. The organic light emitting display of claim 12, wherein the first optical phase retardation layer further comprises an alignment layer configured to align the liquid crystal material.

* * * * *